US008914439B2

(12) United States Patent
Batey et al.

(10) Patent No.: US 8,914,439 B2
(45) Date of Patent: Dec. 16, 2014

(54) FALLBACK ORDERING FOR ON-LINE ENVIRONMENT

(75) Inventors: Christopher Batey, Eastleigh (GB); Alexander Mitchell, London (GB); Adam J. Pilkington, Eastleigh (GB); Stuart P. Wilkinson, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 343 days.

(21) Appl. No.: 13/079,794

(22) Filed: Apr. 4, 2011

(65) Prior Publication Data

US 2011/0252086 A1 Oct. 13, 2011

(30) Foreign Application Priority Data

Apr. 7, 2010 (EP) .................................... 10159182

(51) Int. Cl.

| | |
|---|---|
| ***G06F 15/16*** | (2006.01) |
| ***G06F 15/173*** | (2006.01) |
| ***G06Q 30/06*** | (2012.01) |
| ***H04L 29/14*** | (2006.01) |
| ***H04L 29/08*** | (2006.01) |

(52) U.S. Cl.

CPC ............ *G06Q 30/0601* (2013.01); *H04L 69/40* (2013.01); *H04L 67/02* (2013.01)

USPC ............................ 709/203; 709/217; 709/239

(58) Field of Classification Search

USPC .................. 709/203, 217–232, 238–239, 245

See application file for complete search history.

(56) References Cited

U.S. PATENT DOCUMENTS

| | | | | |
|---|---|---|---|---|
| 5,535,334 | A * | 7/1996 | Merkley et al. | 709/239 |
| 6,490,610 | B1 * | 12/2002 | Rizvi et al. | 718/101 |
| 6,901,380 | B1 * | 5/2005 | Bremers | 705/26.81 |
| 7,177,825 | B1 * | 2/2007 | Borders et al. | 705/26.81 |
| 7,325,045 | B1 | 1/2008 | Manber et al. | |
| 7,818,399 | B1 * | 10/2010 | Ross et al. | 709/218 |
| 2002/0103663 | A1 * | 8/2002 | Bankier et al. | 705/1 |
| 2005/0038832 | A1 | 2/2005 | Feigenbaum | |
| 2007/0067453 | A1 * | 3/2007 | Gale et al. | 709/224 |
| 2007/0174419 | A1 | 7/2007 | O'Connell | |
| 2007/0192246 | A1 | 8/2007 | Futamase | |
| 2008/0005657 | A1 * | 1/2008 | Sneh | 715/501.1 |
| 2010/0161714 | A1 * | 6/2010 | Dongre | 709/203 |
| 2012/0095844 | A1 * | 4/2012 | Barnes, Jr. | 705/14.69 |

* cited by examiner

*Primary Examiner* — Yasin Barqadle

(74) *Attorney, Agent, or Firm* — North Shore Patents, P.C.; Michele Liu Baillie; Lesley Leonessa

(57) ABSTRACT

A method, system and computer program product are provided for fallback ordering for an on-line environment. The method includes: serving a web page from a web server to a client browser; and providing a mechanism in the web page to provide an alternative method of submitting order data from the client browser to a backend application in an event of a failure of the web server hosting the web page.

25 Claims, 5 Drawing Sheets

400
401 FALLBACK MECHANISM ACTIVATED
402 OPTIONALLY, FORM DATA RETRIEVED FROM TEMPORARY STORE
403 LIST OF ALTERNATIVE SUB ROUTES RETRIEVED
404 LIST OF FIELDS TO BE SENT RETRIEVED
405 OPTIONAL FURTHER PROCESSING OF DATA INCLUDING BUSINESS RULES
406 FORM OR FIELDS SUBMITTED TO APPLICATION SERVER VIA ALTERNATIVE SUBMISSION ROUTE
407 WAS ALTERNATIVE SUBMISSION SUCCESSFUL ?
NO
408 ARE THERE FURTHER ALTERNATIVE COMMUNICAITON MEANS ?
YES
NO
YES
410 ORDER COMPLETED AT APPLICATION SERVER
409 FORM SUBMISSION FAILS

110
APPLICATION SERVER
112
113
114
WEB SERVER
FTP SERVER
MAIL SERVER
115
111
CLIENT BROWSER
WEB PAGE
FORM
ALTERNATIVE FORM SUBMISSION TOKEN
LIST OF ALTERNATIVE PROTOCOLS
LIST OF FIELDS OF DATA
TOKEN PROCESSING ENGINE
FAILURE DETECTION COMPONENT
SENDING COMPONENT
100
120
121
122
150
151
152
160
161
162

DISPLAY
214
215
201
203
VIDEO ADAPTER
PROCESSOR
NETWORK ADAPTER
I/O DEVICES
SECOND STORAGE
PRIMARY STORAGE
216
213
212
211
SYSTEM MEMORY
ROM
BIOS
RAM
SOFTWARE
SYSTEM
OS
APPN.S
200
202
204
206
205
207
208
210

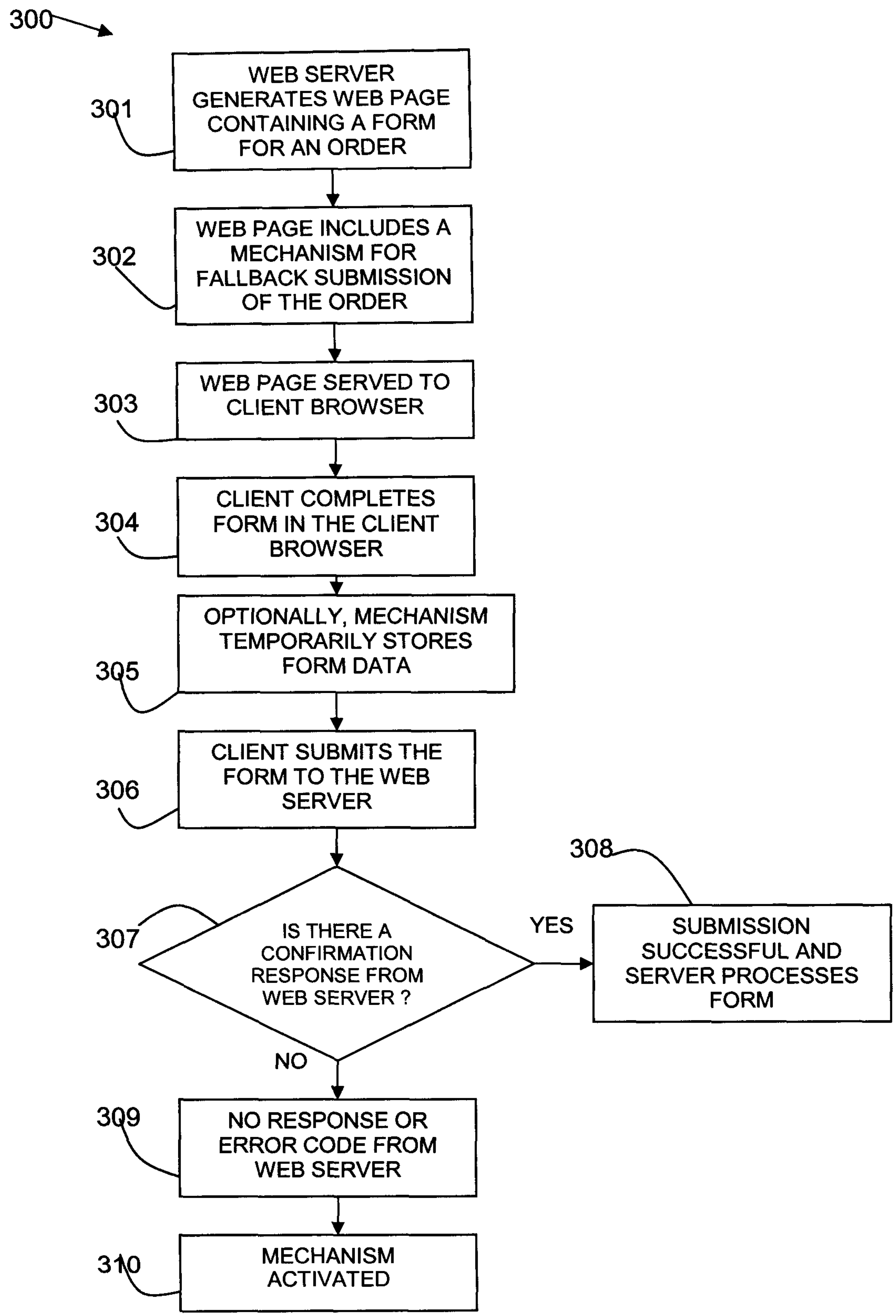
FIG. 3
300
301
WEB SERVER GENERATES WEB PAGE CONTAINING A FORM FOR AN ORDER
302
WEB PAGE INCLUDES A MECHANISM FOR FALLBACK SUBMISSION OF THE ORDER
303
WEB PAGE SERVED TO CLIENT BROWSER
304
CLIENT COMPLETES FORM IN THE CLIENT BROWSER
305
OPTIONALLY, MECHANISM TEMPORARILY STORES FORM DATA
306
CLIENT SUBMITS THE FORM TO THE WEB SERVER
307
IS THERE A CONFIRMATION RESPONSE FROM WEB SERVER ?
YES
308
SUBMISSION SUCCESSFUL AND SERVER PROCESSES FORM
NO
309
NO RESPONSE OR ERROR CODE FROM WEB SERVER
310
MECHANISM ACTIVATED

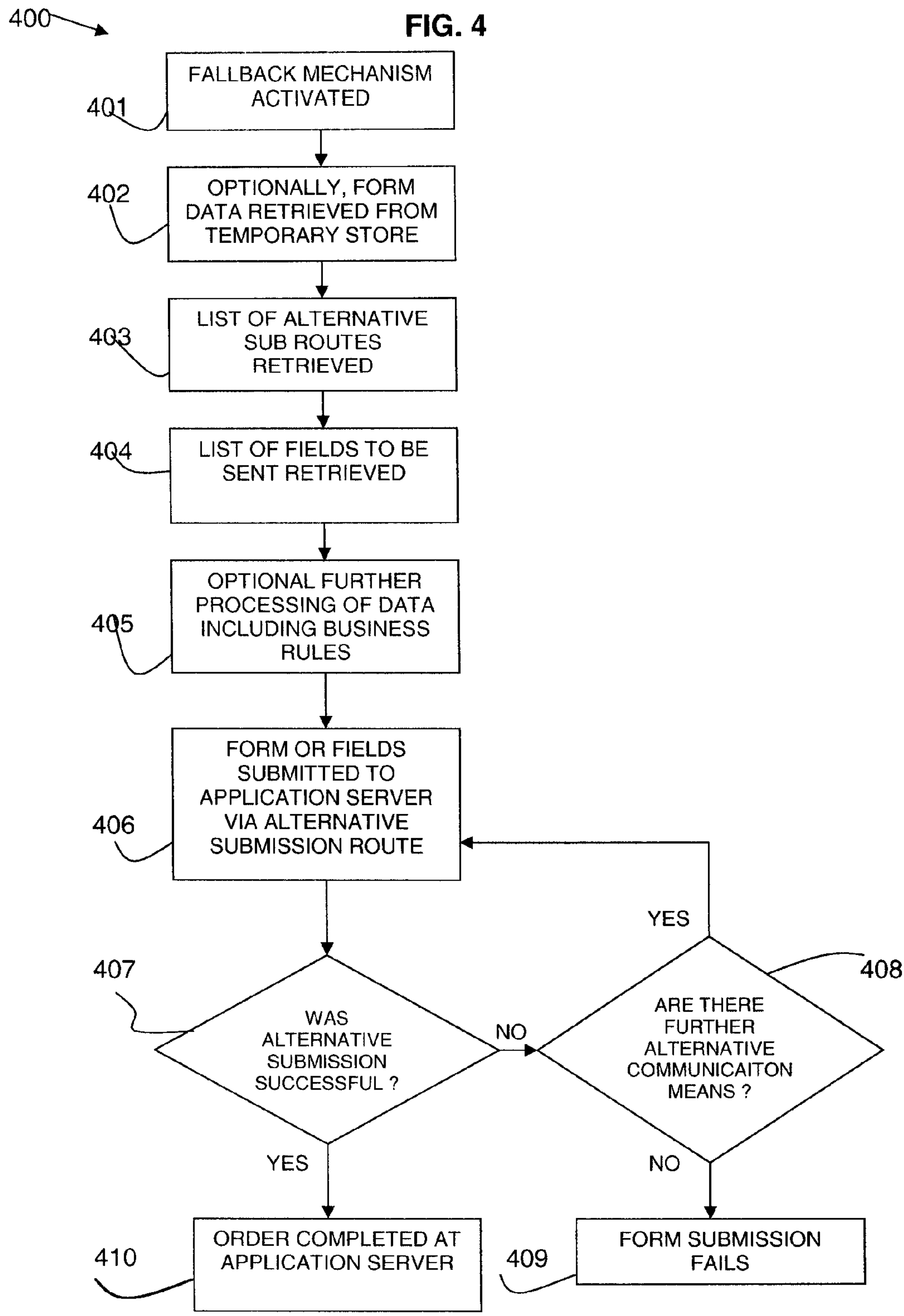
400
FIG. 4
FALLBACK MECHANISM ACTIVATED
401
OPTIONALLY, FORM DATA RETRIEVED FROM TEMPORARY STORE
402
LIST OF ALTERNATIVE SUB ROUTES RETRIEVED
403
LIST OF FIELDS TO BE SENT RETRIEVED
404
OPTIONAL FURTHER PROCESSING OF DATA INCLUDING BUSINESS RULES
405
FORM OR FIELDS SUBMITTED TO APPLICATION SERVER VIA ALTERNATIVE SUBMISSION ROUTE
406
407
WAS ALTERNATIVE SUBMISSION SUCCESSFUL ?
NO
YES
408
ARE THERE FURTHER ALTERNATIVE COMMUNICAITON MEANS ?
YES
NO
ORDER COMPLETED AT APPLICATION SERVER
410
FORM SUBMISSION FAILS
409

FALLBACK ORDERING FOR ON-LINE ENVIRONMENT

CROSS-REFERENCE TO RELATED APPLICATIONS

The present application claims priority to European Patent Application No. 10159182.4, filed on Apr. 7, 2010.

BACKGROUND

This invention relates to the field of on-line commerce. In particular, the invention relates to fallback ordering for an on-line commerce environment.

On-line or e-commerce sites rely on the availability of their web servers in order to be able to conduct business. When these servers become unavailable due to excessive load or if there is an actual error on the server, then customers cannot place orders and goods cannot be sold.

Current solutions to this problem include the following.

1) The customer sending an e-mail to the business. This is an error prone process which requires effort on the part of the customer to correctly identify the item which they wish to purchase, in a context that the receiving entity must be able to understand. They will also have to supply all the required data in order to complete the transaction. This will potentially result in a number of communications (in this case e-mails) between the customer and the business over an extended period of time.

2) Asynchronous queuing of orders using a messaging-orientated middleware product such as IBM WebSphere MQ. (IBM and WebSphere are trademarks of International Business Corporation, registered in many jurisdictions worldwide.) The disadvantage of this method is, although the back end systems have been deployed using queuing technology, if the web server is unable to process the request, then the data cannot be placed on the queue.

3) The customer telephoning the business to place the order. This suffers from all the disadvantages listed in point 1, but also assumes that the telephone number can be located in the first place. Several internet only traders do not list any contact options beyond e-mail.

BRIEF SUMMARY

According to a first aspect of the present invention, a method for fallback ordering for an on-line environment comprises: serving a web page from a web server to a client browser; and providing a mechanism in the web page to provide an alternative method of submitting order data from the client browser to a backend application in an event of a failure of the web server hosting the web page.

According to a second aspect of the present invention, computer program product for fallback ordering for an on-line environment comprises a computer-readable storage medium storing computer-executable instructions, which when executed by a computer, performs the following: serve a web page from a web server to a client browser; and provide a mechanism in the web page to provide an alternative method of submitting order data from the client browser to a backend application in an event of a failure of the web server hosting the web page.

According to a third aspect of the present invention, a system for fallback ordering for an on-line environment comprises: a web server hosting a web page comprising a mechanism to provide an alternative method of submitting an order from a client browser to a backend server; and the backend server for processing the order in an event of a failure of the web server.

BRIEF DESCRIPTION OF THE SEVERAL VIEWS OF THE DRAWINGS

The subject matter regarded as the invention is particularly pointed out and distinctly claimed in the concluding portion of the specification. The present invention, both as to organization and method of operation, together with objects, features, and advantages thereof, may best be understood by reference to the following detailed description when read with the accompanying drawings in which:

FIG. 3 is a flow diagram of a method in accordance with an aspect of the present invention; and FIG. 4 is a flow diagram of a method in accordance with an aspect of the present invention.

DETAILED DESCRIPTION

Figure 1A:
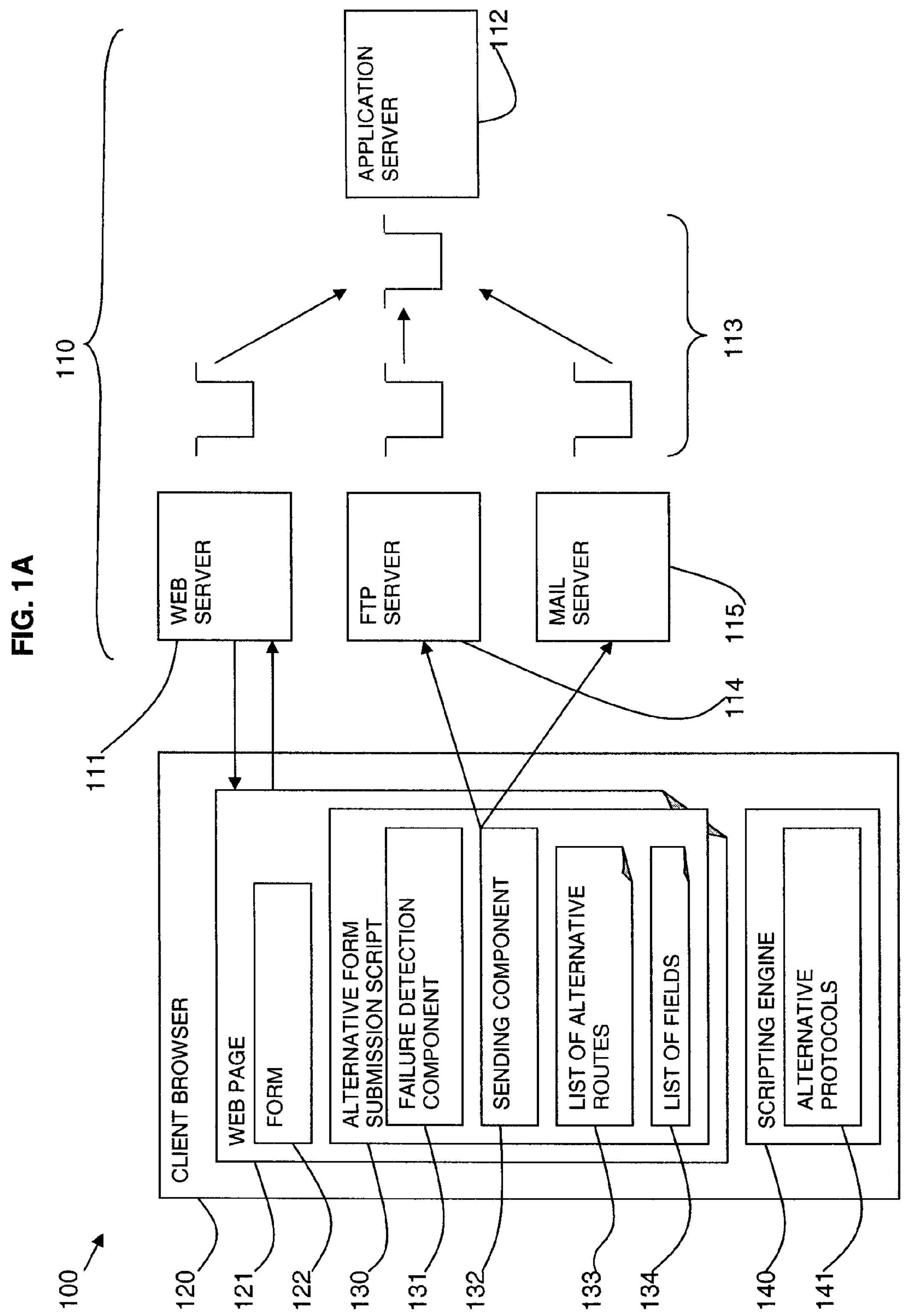
FIG. 1A is a block diagram of a first embodiment of a system in accordance with the present invention.

A case, it is unlikely that the client's order will complete and the client will not know whether it succeeded or not.

In a first embodiment, a script is provided in a web order page for detecting a web server failure and transmitting data via an alternative channel. The script contains the code necessary to detect a transmission failure and to retry using an alternative method. The script hooks into a client browser and temporarily stores form data which the client has entered in a web page and submitted.

A scripting engine available in the client browser is used to run the script, for example, an integrated component of the client browser such as JavaScript or VBScript in Internet Explorer. (Java and all Java-based trademarks and logos are trademarks or registered trademarks of Oracle and/or its affiliates and VBScript and Internet Explorer are products of Microsoft Corporation.) Scripting engines such as JavaScript may only have limited capability to use other protocols. Therefore, the script may use Ajax (asynchronous JavaScript and XML) as a way of using JavaScript to provide alternate routes via HTTP(S) and FTP(S).

Ajax is a group of interrelated web development techniques used on the client-side to create interactive web applications. With Ajax, web applications can retrieve data from the server asynchronously in the background without interfering with the display and behavior of the existing page. Despite the name, the use of XML is not actually required, nor do the requests need to be asynchronous.

The script intercepts any time-outs or error conditions and attempts to submit the form data via an alternate method, the details of which are included in the script. The client may be informed that their order is being transmitted by an alternate method, and told whether that method completes or not. By supplying multiple alternatives in the script, each could be tried in turn or randomly until a working connection is established.

An example script may be as follows:

```
if( server_not_responding == true ) {
Socket alt = new Socket ("alternatehostname", port_num);
alt.write(form.data);
alt.flush(( );
alt.close( );
sysout("Sent Order for alternate processing")
}
```

The alternative protocols available to make the transaction depend on what is supported by the scripting engine. These would typically be HTTP (Hypertext Transfer Protocol), HTTPS (Hypertext Transfer Protocol Secure), FTP (File Transfer Protocol) and FTPS (File Transfer Protocol Secure).

In a second embodiment, a token is embedded in a web page. A separate suitable processing engine is installed on the client browser as a plugin. The processing engine would handle the transmission failure and retry. The token would not need to contain any code and would therefore be smaller than the script used in the first embodiment. The token would include the list of alternate protocols/URLs (Uniform Resource Locators) to try and a list of the files which should be sent (for example, item ID, quantity, etc.).

Plugins are more powerful and have direct access to the underlying operating system and therefore more protocols.

In both embodiments, the mechanism whether script or token and engine, contains enough information in it to allow a customer to complete an off-line order and submit it back to the seller without necessarily going through a web site.

An advantage of this method is that when the normal web site is not available for e-commerce then multiple alternative transmission routes capable of processing the order can be embedded in the mechanism allowing for an arbitrary number of fallback points.

The customer is still able to initiate the order and reserve the items. This is particularly advantageous when a site goes down due to a special offer (such as concert tickets becoming available), where obtaining a position in the queue is an important factor.

The mechanism allows for business rules to be applied to the data when customers place an order. Rules can be specified in the token or script which can be processed on the client machine before the request is sent via one of the backup methods. This allows a certain amount of validation to be carried out before sending the request, because unlike when sending the request via the usual method to the web server, there will be no instant reply when the request is sent via an alternate method.

Examples of such business rules include:

The maximum/minimum number of a particular item which can be ordered in one transaction could be specified;

A 'sell by' date could be specified after which point the customer will no longer be able to order that item;

A discount of say 5% could be applied to the order value by way of compensation for not being able to complete their order in the usual way and as an incentive to complete it via an alternate method.

This is an advantage over business to business queuing systems where it is only the data that is transferred between systems.

If payment for goods is required, then the scripting engine or token processing engine can coordinate payment through a third party payment gateway and then include the complete transaction reference on the order. This allows the business to identify that the goods have been paid for and allows sales to be made even when access to their own internal payment systems is not available. In the embodiment of the scripting engine, JavaScript may use Ajax or SOAP protocols to process payment. In the embodiment of the token processing agent in the form of a browser plugin, Ajax or SOAP may be used or another method via an alternative protocol.

Referring to FIG. 1A, a block diagram shows a first embodiment of the described system in accordance with the present invention. The system 100 includes an e-commerce infrastructure 110 including a web server 111 and an application or backend server 112 which processes transactions carried out via the web server 111. In this example embodiment, the web server 111 and application server 112 are linked via an asynchronous queuing mechanism 113 although other communication systems may be used. The e-commerce infrastructure 110 also includes alternative destinations for transmitting data to the application server 112, in this example, an FTP (File Transfer Protocol) server 114 and a mail server 115 also linked via the queuing mechanism 113 to the application server 112.

The system 100 includes a client web browser 120 on which a client may view web pages 121 generated by the e-commerce web server 111. The client web browser 120 may be connected to the web server 111, FTP server 114 and mail server 115 via a network such as the Internet.

A web page 121 generated by the web server 111 is viewed on a client web browser 120 as a HTML (Hypertext Mark-up Language) page. The web page 121 includes a form 122 or other information to be submitted by the client user to the application server 112.

In this first embodiment, the web page 121 includes an alternative form submission mechanism in the form of a script 130. The script 130 contains all the code to detect a transmission failure and retry the form submission via an alternative method. The client browser 120 includes a scripting engine 140 with alternative protocols 141 available to make the transaction. For example, the scripting engine 140 may be a JavaScript engine with alternative protocols of HTTP, HTTPS, FTP, and FTPS.

The script 130 includes a failure detection component 131 to activate the script 130 if the web server 111 is off-line due to an error or other reason. The failure detection component 131 may activate the script 130 when attempting to submit the form 122 to the web server 111 and no response or an error is received. Alternatively, the script 130 may start when the failure detection component 131 identifies a lack of server connection before the form 122 is submitted.

The alternative form submission script 130 includes a sending component 132 for sending the form 122 or selected fields from the form to an alternative destination in the e-commerce infrastructure 110 other than the web server 111. For example, the form may be sent to an FTP server 114 or mail server 115. The script 130 includes a list of alternative submission routes 133 and a list of fields 134 of the form or data to be transmitted. The list of alternative submission routes 133 may include a prioritization of the alternative destinations, a user input mechanism for selecting the alternative; or a random selection of the alternative destinations.

Figure 1B:
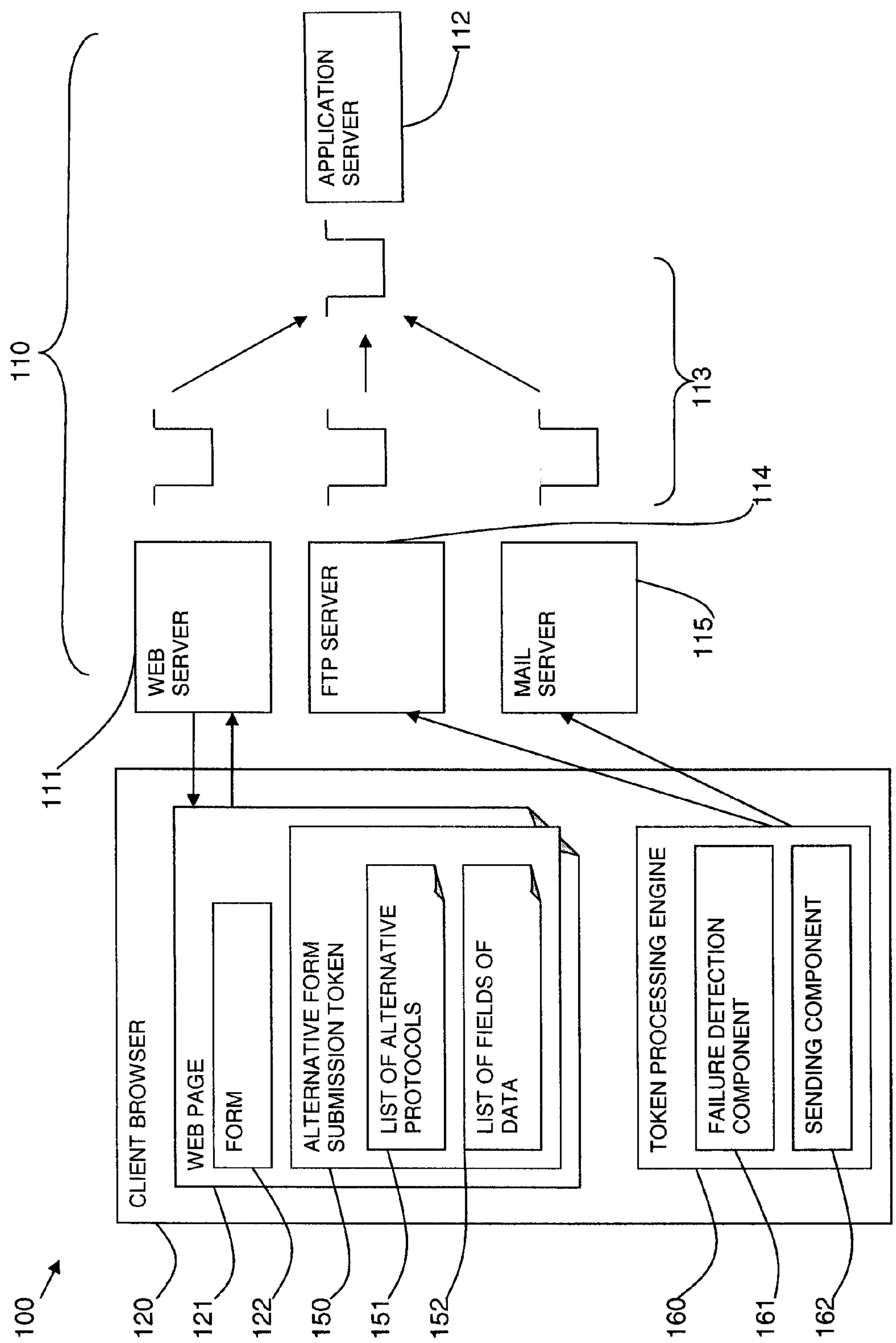
FIG. 1B is a block diagram of a second embodiment of a system in accordance with the present invention.

Referring to FIG. 1B, a block diagram shows a second embodiment of the described system. The system 100 includes an e-commerce infrastructure 110, for example, as shown in FIG. 1A.

The system 100 includes a client web browser 120 on which a client may view web pages 121 generated by the e-commerce web server 111. The client web browser 120 may be connected to the web server 111, FTP server 114 and mail server 115 via a network such as the Internet.

A web page 121 generated by the web server 111 is viewed on a client web browser 120 as a HTML (Hypertext Mark-up Language) page. The web page 121 includes a form 122 or other information to be submitted by the client user to the application server 112.

In this second embodiment, the web page 121 includes an alternative form submission mechanism in the form of a token 150 and a separate plugin installed on the client browser 120 in the form of a token processing engine 160 which handles the transmission failure and retry. The token 150 contains a list of alternative protocols 151 for the alternative submission routes and a list of fields 152 of data to be sent.

The token processing engine 160 includes a failure detection mechanism 161 to activate the token 150 and engine 160 if the web server 111 is off-line due to an error or other reason. As in the first embodiment, the failure detection component 161 may activate the retry when attempting to submit the form 122 to the web server 111 and no response or an error is received. Alternatively, the failure detection component 131 may identify a lack of server connection before the form 122 is submitted.

The token processing engine 160 includes a sending component 162 for sending the form 122 to an alternative destination in the e-commerce infrastructure 110 other than the web server 111. For example, the form may be sent to an FTP server 114 or mail server 115. The token 150 includes a list of alternative submission routes 151 and a list of fields 152 of the form or data to be transmitted. The list of alternative submission routes 151 may include a prioritization of the alternative routes, a user input mechanism for selecting the alternative; or a random selection of the alternative routes.

Figure 2:
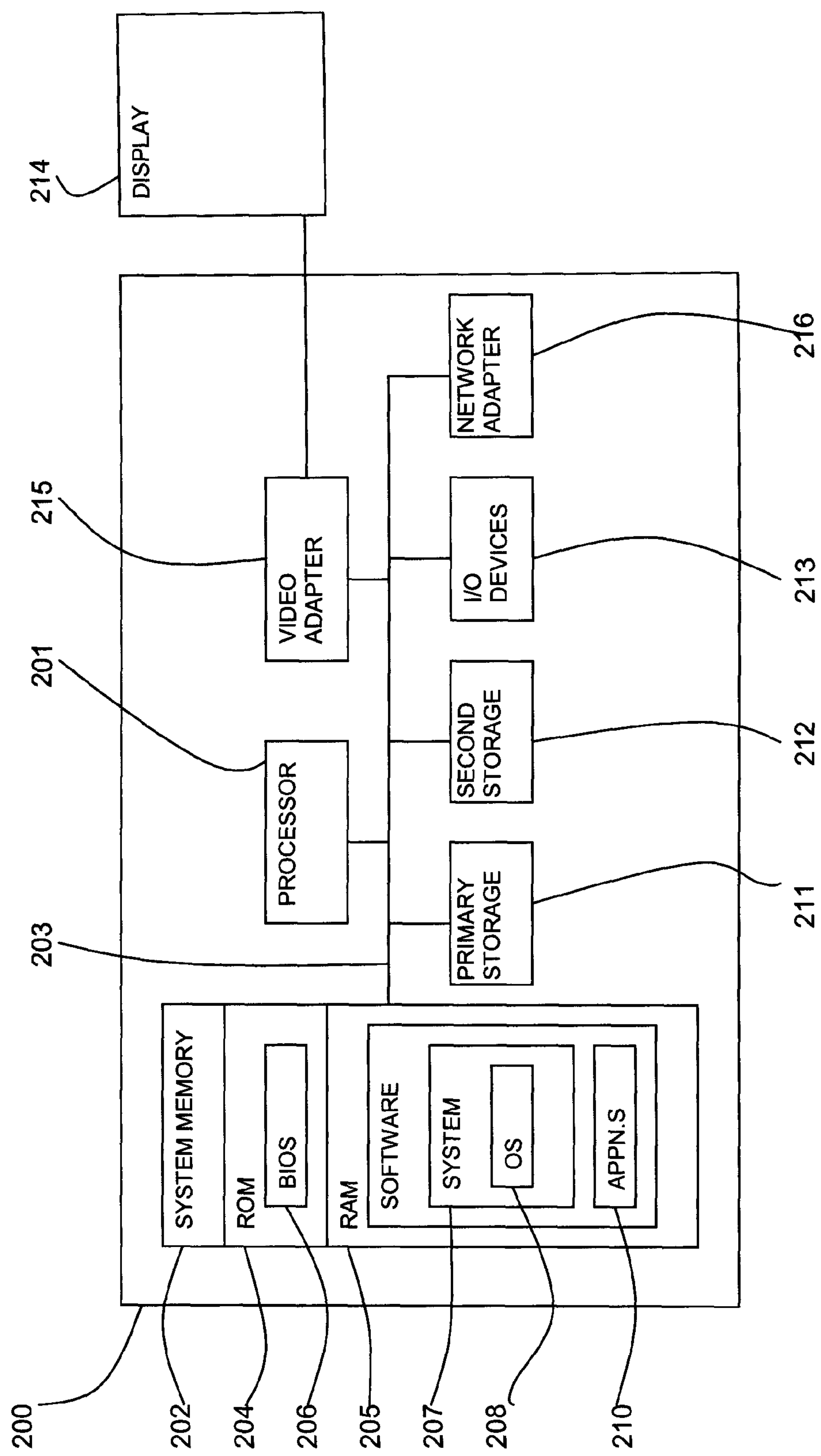
FIG. 2 is a block diagram of a computer system in which the present invention may be implemented.

Referring to FIG. 2, an exemplary system for implementing aspects of the present invention includes a data processing system 200 suitable for storing and/or executing program code including at least one processor 201 coupled directly or indirectly to memory elements through a bus system 203. The memory elements can include local memory employed during actual execution of the program code, bulk storage, and cache memories which provide temporary storage of at least some program code in order to reduce the number of times code must be retrieved from bulk storage during execution.

The memory elements may include system memory 202 in the form of read only memory (ROM) 204 and random access memory (RAM) 205. A basic input/output system (BIOS) 206 may be stored in ROM 204. System software 207 may be stored in RAM 205 including operating system software 208. Software applications 210 may also be stored in RAM 205.

The system 200 may also include a primary storage means 211 such as a magnetic hard disk drive and secondary storage means 212 such as a magnetic disc drive and an optical disc drive. The drives and their associated computer-readable media provide non-volatile storage of computer-executable instructions, data structures, program modules and other data for the system 200. Software applications may be stored on the primary and secondary storage means 211, 212 as well as the system memory 202.

The computing system 200 may operate in a networked environment using logical connections to one or more remote computers via a network adapter 216.

Input/output devices 213 can be coupled to the system either directly or through intervening I/O controllers. A user may enter commands and information into the system 200 through input devices such as a keyboard, pointing device, or other input devices (for example, microphone, joy stick, game pad, satellite dish, scanner, or the like). Output devices may include speakers, printers, etc. A display device 214 is also connected to system bus 203 via an interface, such as video adapter 215.

Referring to FIG. 3, a flow diagram 300 shows an embodiment of a method of fallback ordering for an on-line environment according to the present invention.

A web server generates 301 a web page containing an order form or other form requiring a response to an application server or backend server by a client. The web page is generated to include 302 a mechanism for fallback submission of the form with error handling and alternate form submission routes to the application server. The fallback mechanism may be a script in the web page run on a scripting engine in the client browser or a token in the web page with a token processing engine installed on the client browser.

The web page is served 303 to the client browser and the client completes 304 the form in the client browser and the mechanism optionally temporarily stores the form data 305. The client submits 306 the form to the application server via the web server.

It is determined 307 if there is a confirmation response from the web server. If so, the form submission is successful and the application server processes 308 the form. If there is no response from the web server or a server error code is returned 309, the fallback mechanism is activated 310 to send the form of fields from the form to the application server via alternative submission routes.

In an alternative embodiment, it is attempted to detect in advance of sending the form, if the server is responding or not. At this point, the data is still in the browser form fields and can be read directly for sending via a fallback route.

Referring to FIG. 4, a flow diagram 400 shows a method once a web server has failed. The fallback mechanism is activated 401 and retrieves the form data 402 if this has been completed and stored. The list of alternative submission routes is retrieved 403 and the list of fields of the form data to be sent and the format is retrieved 404. Optionally, further processing of the data is carried out including applying 405 business rules, including for example, external payment via another party.

The form or selected fields from the form are then submitted 406 to the application server via an alternative submission route. It is determined 407 if the alternative submission was successful. If it was not successful, it is determined 408 if there is a further alternative submission route. If so, the method loops to submit 406 the form via the alternative submission route. If there are no alternative submission routes, the form submission fails 409.

If the submission of the form via an alternative submission route succeeds, the order is completed 410 at the application server.

The list of alternative submission methods or routes to reach the application server is generated by an administrator responsible for setting up the alternative backend processing. The client may either try each listed alternative method in turn until a method is found that works, or the client may try them in a random order, which may help balance load over all available methods.

The list of alternative methods is constructed such that any alternative connection method specified in the token/script would be applicable for the transactions which can be made from the page where the token/script is found.

Ensuring that a transaction is only processed once is typically done when placing an order online. Either the backend server will discard duplicate identical orders, which protects against a user hitting "submit" multiple times, or it could process the transactions as many times as it receives it. The latter allows a customer to order the same thing twice, which they may legitimately wish to do, but does not protect against the user accidentally hitting the "submit" button multiple times.

The described method provides control over the format of what is submitted to suit the alternative methods of transmission. If it is not possible to send the exact format for the transmission method, a transformation engine may be used to convert the required internal format when the transaction arrives at the server.

A fallback ordering method may be provided as a service to a customer over a network.

The present invention can take the form of an entirely hardware embodiment, an entirely software embodiment or an embodiment containing both hardware and software elements. In a preferred embodiment, the present invention is implemented in software, which includes but is not limited to firmware, resident software, microcode, etc.

The present invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

What is claimed is:

1. A method for fallback ordering for an on-line environment, comprising:

serving a web page from a web server to a client browser, the web page served to collect a customer order entered via the served web page;

collecting order data, wherein the order data comprises the customer order entered via the served web page; and providing a mechanism in the served web page, wherein the mechanism in the served web page activates when the mechanism detects a failure of the web server hosting the served web page, wherein the mechanism in the served web page, in response to the failure of the web server, identifies an alternate method of submitting the order data using an alternate communications protocol, wherein the mechanism contains code necessary to detect a transmission failure, to retry using the alternative method, and to send the order data, wherein the mechanism provides validation of the order data prior to submitting the order data using the alternate method of submitting the order data, wherein the mechanism allows the customer order to be completed off-line and submitted via the alternate method, wherein the mechanism collects queue data when an ordered sequence in which a plurality of customer orders are placed impacts whether the customer order will be fulfilled, and wherein the mechanism in the served web page submits the order data, to complete the customer order, from the client browser to a backend application using the alternate communications protocol.

2. The method of claim 1, wherein the mechanism comprises a script which hooks into the client browser and is run by a scripting engine available in the client browser.

3. The method of claim 2, wherein the script detects the failure in the web server and retries the submission of the order data using the alternative method.

4. The method of claim 1, wherein the mechanism comprises a token in the web page with a token processing engine installed in the client browser.

5. The method of claim 4, wherein the token processing engine handles the detection of the failure of the web server and retries the submission of the order data using the alternative method, wherein the token comprises a list of alternative submission routes and a list of fields of the order data to be submitted.

6. The method of claim 1, wherein more than one alternative method of submitting the order data are provided as alternative submission routes using the alternative communications protocols.

7. The method of claim 6, wherein the alternative methods of submitting the order data are provided in a prioritized order.

8. The method of claim 6, wherein the alternative methods of submitting the order data are provided in a random order to spread a load over available alternative methods.

9. The method of claim 1, wherein the failure of the web server is detected by an error message or a time out.

10. The method of claim 1, wherein the mechanism stores the order data input by a client in a temporary storage location for retrieval in the event of the failure of the web server.

11. The method of claim 1, wherein the mechanism enables business rules to be applied to the order data prior to submitting the order data using the alternate method of submitting the order data.

12. The method of claim 1, wherein the mechanism enables coordination of payment for an order via a third party with a transaction reference included in the alternative method of submitting the order data.

13. A computer program product for fallback ordering for an on-line environment, the product comprising a computer-readable storage device storing computer-executable instructions, which when executed by a computer, perform the following:

serve a web page from a web server to a client browser, the web page served to collect a customer order entered via the served web page;

collect order data, wherein the order data comprises the customer order entered via the served web page; and provide a mechanism in the served web page, wherein the mechanism in the served web page activates when the mechanism detects a failure of the web server hosting the served web page, wherein the mechanism in the served web page, in response to the failure of the web server, identifies an alternate method of submitting the order data using an alternate communications protocol, wherein the mechanism contains code necessary to detect a transmission failure, to retry using the alternative method, and to send the order data, wherein the mechanism provides validation of the order data prior to submitting the order data using the alternate method of submitting the order data, wherein the mechanism allows the customer order to be completed off-line and submitted via the alternate method, wherein the mechanism collects queue data when an ordered sequence in which a plurality of customer orders are placed impacts whether the customer order will be fulfilled, and wherein the mechanism in the served web page submits the order data, to complete the customer order, from the client browser to a backend application using the alternate communications protocol.

14. The computer program product of claim 13, wherein the mechanism comprises a script which hooks into the client browser and is run by a scripting engine available in the client browser.

15. The computer program product of claim 14, wherein the script detects the failure in the web server and retries the submission of the order data using the alternative method.

16. The computer program product of claim 13, wherein the mechanism comprises a token in the web page with a token processing engine installed in the client browser.

17. The computer program product of claim 16, wherein the token processing engine handles the detection of the failure of the web server and retries the submission of the order data using the alternative method, wherein the token comprises a list of alternative submission routes and a list of fields of the order data to be submitted.

18. The computer program product of claim 13, wherein more than one alternative method of submitting the order data are provided as alternative submission routes using the alternative communications protocols.

19. The computer program product of claim 13, wherein the mechanism stores the order data input by a client in a temporary storage location for retrieval in the event of the failure of the web server.

20. A system for fallback ordering for an on-line environment, comprising:

a web server hosting a served web page, the served web page hosted to collect order data, wherein the order data comprises a customer order entered via the served web page, the web page comprising a mechanism, wherein the mechanism in the served web page activates when the mechanism detects a failure of the web server hosting the served web page, wherein the mechanism in the served web page, in response to the failure of the web server, identifies an alternate method of submitting the order data using an alternate communications protocol, wherein the mechanism contains code necessary to detect a transmission failure, to retry using the alternative method, and to send the order data, wherein the mechanism provides validation of the order data prior to submitting the order data using the alternate method of submitting the order data, wherein the mechanism allows the customer order to be completed off-line and submitted via the alternate method, wherein the mechanism collects queue data when an ordered sequence in which a plurality of customer orders are placed impacts whether the customer order will be fulfilled, and wherein the mechanism in the served web page submits the order data, to complete the customer order, from the client browser to a backend application using the alternate communications protocol; and the backend server for processing the order in an event of the failure of the web server.

21. The system of claim 20, wherein the mechanism comprises a script which hooks into the client browser and is run by a scripting engine available in the client browser.

22. The system of claim 21, wherein the script comprises code for a failure detection component to detect the failure in the web server and a sending component to retry the submission of the order data using the alternative method.

23. The system of claim 20, wherein the mechanism comprises a token in the web page with a token processing engine installed in the client browser.

24. The system of claim 23, wherein the token processing engine comprises code for a detection failure component and a sending component for the retry of the submission of the order data using the alternative method, wherein the token comprise a list of alternative submission routes and a list of fields of the order data to be submitted.

25. The system of claim 20, wherein more than one alternative method of submitting the order data are provided in the mechanism as alternative submission routes using the alternative communications protocols.

* * * * *